United States Patent
Hsieh et al.

(10) Patent No.: US 8,767,759 B2
(45) Date of Patent: Jul. 1, 2014

(54) METHOD OF REDUCING REQUIRED CAPACITY OF RETRY BUFFER FOR REAL-TIME TRANSFER THROUGH PCIE AND RELATED DEVICE

(75) Inventors: Teng-Chuan Hsieh, New Taipei (TW); Ming-Hsu Hsu, Taipei (TW); Huei-Chiang Shiu, New Taipei (TW)

(73) Assignee: Etron Technology, Inc., Hsinchu (TW)

( * ) Notice: Subject to any disclaimer, the term of this patent is extended or adjusted under 35 U.S.C. 154(b) by 355 days.

(21) Appl. No.: 13/253,080

(22) Filed: Oct. 5, 2011

(65) Prior Publication Data

US 2012/0087379 A1 Apr. 12, 2012

(30) Foreign Application Priority Data

Oct. 6, 2010 (TW) .............................. 99134014 A

(51) Int. Cl.
*G01R 31/08* (2006.01)
*H04L 12/28* (2006.01)
*H04J 3/24* (2006.01)
*H04J 3/00* (2006.01)
*H04L 1/18* (2006.01)

(52) U.S. Cl.
USPC ........... 370/412; 370/236; 370/474; 370/476; 714/748

(58) Field of Classification Search
USPC ......... 370/235, 236, 252, 392, 412, 418, 474, 370/476; 709/228, 231, 236; 714/748
See application file for complete search history.

(56) References Cited

U.S. PATENT DOCUMENTS

| | | | |
|---|---|---|---|
| 7,573,821 B2 * | 8/2009 | Chilukoor et al. | 370/235 |
| 2002/0064128 A1 * | 5/2002 | Hughes et al. | 370/229 |
| 2004/0073716 A1 * | 4/2004 | Boom et al. | 709/250 |
| 2007/0124626 A1 | 5/2007 | Lee | |
| 2009/0086747 A1 * | 4/2009 | Naven et al. | 370/412 |
| 2009/0185551 A1 * | 7/2009 | Winter | 370/351 |
| 2011/0145447 A1 * | 6/2011 | Dimond | 710/23 |

* cited by examiner

*Primary Examiner* — Redentor Pasia
(74) *Attorney, Agent, or Firm* — Winston Hsu; Scott Margo

(57) ABSTRACT

A method capable of reducing a required capacity of a retry buffer of a link device when the link device transfers real-time data to a link partner through the PCIe interface determines how to resend a packet required by the link partner according to the type of the packet. When the packet is a data packet, the method determines if a pending data packet exists in a pending transmission data buffer. When the pending data packet exists in the pending transmission data buffer, the link device directly transmits the pending data packet to the link partner. When the pending data packet does not exist in the pending transmission data buffer, the link device transmits a dummy packet to the link partner. In this way, the retry buffer only requires enough capacity to store the dummy packet and buffer the command data packets.

20 Claims, 3 Drawing Sheets

METHOD OF REDUCING REQUIRED CAPACITY OF RETRY BUFFER FOR REAL-TIME TRANSFER THROUGH PCIE AND RELATED DEVICE

CROSS-REFERENCE TO RELATED APPLICATIONS

This application claims priority to Taiwan Patent Application No. 099134014 filed Oct. 6, 2010 and included herein by reference in its entirety for all intents and purposes.

BACKGROUND OF THE INVENTION

1. Field of the Invention

The present invention relates to real-time transfer over a Peripheral Component Interconnect Express (PCIe) interface, and particularly to a method of reducing retry buffer capacity required when performing real-time transfer over a PCIe interface.

2. Description of the Prior Art

Please refer to FIG. 1, which is a diagram illustrating data transfer over a PCIe interface between a link device 100 and a link partner 101. When the link device 100 is a host, the link partner 101 is a corresponding device. When the link device 100 is a device, the link partner 101 is a corresponding host. The link device 100 comprises a retry buffer 110 and a packet transmission circuit 120. The packet transmission circuit 120 is utilized for transmitting packets. The retry buffer 110 is utilized for storing transmitted packets. For example, if the link device 100 wants to transmit a packet DP, and the packet DP is either a command packet DPCMD or a data packet DPDATA, the retry buffer 110 will store the packet DP, then transmit the packet DP to the packet transmission circuit 120 for the packet transmission circuit 120 to transmit the packet DP to the link partner 101. If the link partner 101 transmits an Acknowledged (ACK) command CMDACK corresponding to the packet DP, this means that the link partner 101 has already successfully received the packet DP. Thus, the link device 100 can obtain a packet sequence number corresponding to the packet DP according to the Acknowledged command CMDACK, and the link device 100 can control the retry buffer according to the packet sequence number SEQ for clearing the stored packet DP. If the link partner 101 transmits a retry command CMDNAK, such as a Not Acknowledged (NAK) command, it means the link partner 101 has not successfully received the packet DP. Thus, the link device 100 obtains the packet sequence number SEQ of the packet DP according to the retry command CMDNAK, and the link device 100 reads the packet DP stored in the retry buffer 110 according to the packet sequence number SEQ. In this way, the packet transmission circuit 120 can retransmit the packet DP to the link partner 101.

However, when the link device 100 and the link partner 101 perform real-time transfer across the PCIe interface, for example, when the link device 100 sends audio or video data by the packet $DP_1$ (the packet $DP_1$ is a data packet), if the link partner 101 has yet to receive the packet $DP_1$ successfully, the link partner 101 sends a retry command $CMD_{NAK1}$ corresponding to packet $DP_1$ according to the description of FIG. 1, so that the link device 100 must retransmit the packet $DP_1$. Even if the packet $DP_1$ is a data packet $DP_{DATA}$ for transmitting audio or video data, the link device 100 resends the packet $DP_1$ once according to the retry command $CMD_{NAK1}$. When the link device 100 and the link partner 101 transmit data over the PCIe interface for transmitting audio or video, every data packet $DP_{DATA}$ must first be stored in the retry buffer 110, then transmitted by the packet transmission circuit 120 to the link partner 101. The retry buffer 110 must have sufficient capacity for storing packets (command packets $DATA_{CMD}$ or data packets $DATA_{DATA}$), so that the link device 100 may transmit packets continuously to speed up real-time transfer. Because command packet size is defined in the PCIe specification to be 64-72 bytes, and data packet size is defined as 72-4096 bytes, if the retry buffer 110 is to be designed to buffer M data packets $DP_{DATA}$, the retry buffer 110 must have capacity of 4096×M bytes. Thus, cost of the link device 100 is increased greatly by the high-capacity retry buffer 110, which is an inconvenience to a user thereof.

SUMMARY OF THE INVENTION

According to an embodiment, a method of performing real-time transfer over a Peripheral Component Interconnect Express (PCIe) interface comprises a link device receiving a retry command (NAK) from a link partner to obtain a retry packet sequence number, the link device determining type of a first packet that the link partner requests be resent according to the retry packet sequence number, and the link device deciding how to resend the first packet according to the type of the first packet.

According to an embodiment, a link device for performing real-time transfer with a link partner over a Peripheral Component Interconnect Express (PCIe) interface comprises a pending transmission data buffer for buffering pending data, a retry buffer, a packet type determination circuit for determining type of packets, and a packet transmission circuit for transmitting packets. The retry buffer comprises a data buffer circuit for storing a dummy packet, and a command buffer circuit for buffering already sent command packets. When the link device receives a retry command from the link partner for requesting the link device to resend a first packet, the packet type determination circuit determines type of the first packet according to the retry command, and controls the packet transmission circuit to resend the first packet or directly send a second packet according to the type of the first packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
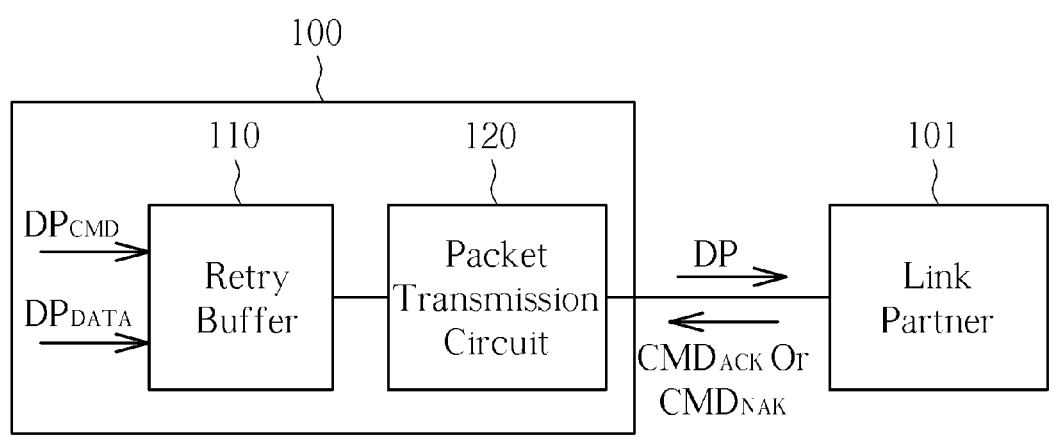
FIG. 1 is a diagram illustrating data transfer over a PCIe interface between a link device and a link partner.
Figure 2:
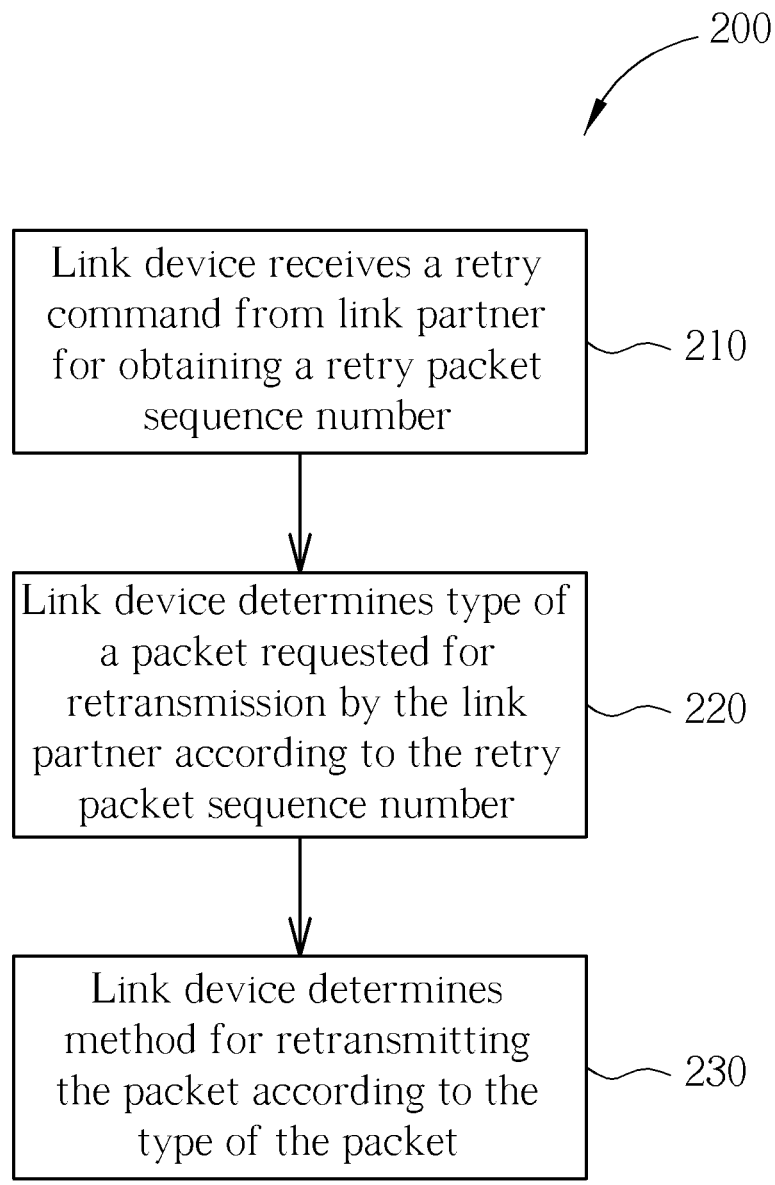
FIG. 2 is a diagram of a process for reducing capacity required by a retry buffer when performing real-time transfer over a PCIe interface.

Please refer to FIG. 2, which is a diagram of a process 200 for reducing capacity required by a retry buffer when performing real-time transfer over a PCIe interface. It is assumed that a link device LD and a link partner LP perform real-time transfer over a PCIe interface, and the link device LD records packet sequence numbers and types of each packet when sending packets, so as to establish a lookup table TA of packet sequence numbers and types. The link device LD comprises a pending transmission data buffer WSBUF, a retry buffer RSBUF, and a packet transmission circuit PSCKT. The pending transmission data buffer WSBUF is utilized for storing data waiting to be transmitted. For example, the pending transmission data buffer WSBUF may receive video data from a camera. The retry buffer RSBUF comprises a data buffer DABUF, and a command buffer CMDBUF. The data buffer DABUF stores a dummy packet $DP_{DUMMY}$. The dummy packet $DP_{DUMMY}$ has 72 bytes of dummy data. The command buffer CMDBUF is utilized for storing previously transmitted command packets. The packet transmission circuit PSCKT is utilized for transmitting packets. The process 200 comprises the following steps:

Step 210: The link device LD receives a retry command $CMD_{NAK1}$ from the link partner LP for obtaining a retry packet sequence number $SEQ_1$;

Step 220: The link device LD determines type of a packet $DP_1$ requested for retransmission by the link partner LP according to the retry packet sequence number $SEQ_1$; and Step 230: The link device LD determines method for retransmitting the packet $DP_1$ according to the type of the packet $DP_1$.

In step 220, the link device LD may obtain the type of the packet $DP_1$ to be retransmitted as requested by the link partner LP according to the retry packet sequence number $SEQ_1$ and the lookup table TA. For example, the packet sequence number of the packet $DP_1$ equals 1, and the packet $DP_1$ is a data packet. When the link device LD sends the packet $DP_1$, the link device LD records the packet sequence number (1) of the packet $DP_1$, and the type (data packet) of the packet $DP_1$ to the lookup table TA. In step 210, the link device LD obtains the retry packet sequence number $SEQ_1$ from the retry command $CMD_{NAK1}$ received. Assuming the retry packet sequence number $SEQ_1$ equals 1, the link device LD may determine that the type of the packet $DP_1$ that the link partner LP is requesting be resent is a data packet according to the retry packet sequence number $SEQ_1$ and the lookup table TA.

In step 230, the link device LD determines how to resend the packet $DP_1$ according to the type of the packet $DP_1$ determined in step 220. More particularly, when the packet $DP_1$ is a data packet, the link device LD does not resend the packet $DP_1$, but instead directly sends the next packet $DP_2$ to the link partner LP. When the packet $DP_1$ is a command packet, the link device LD resends the packet $DP_1$.

Because the link device LD and the link partner LP utilize the PCIe interface to perform real-time transfer, when the packet $DP_1$ is a data packet, data transmitted by the packet DP1 is actually voice data or video data. Because resending voice data or video data during real-time transfer between the link device LD and the link partner LP can only introduce unnecessary delay, the link device LD does not need to resend the packet DP1, but can directly send the next packet $DP_2$ to the link partner LP. Thus, at this time, the link device determines whether or not the pending transmission data buffer WSBUF has a pending data packet $DP_{WS}$ to decide how to transmit the packet $DP_2$.

More particularly, when the pending transmission data buffer WSBUF has a pending data packet $DP_{WS}$, the packet sequence number of the pending data packet $DP_{WS}$ is set according to the retry packet sequence number $SEQ_1$. For example, when the retry packet sequence number $SEQ_1$ equals 1, the packet sequence number of the data packet $DP_{WS}$ is set to 1. Then, the packet transmission circuit PSCKT sends the data packet $DP_{WS}$ as the packet $DP_2$ to the link partner LP. In other words, when the pending transmission data buffer WSBUF buffers video data of a camera that is waiting to be sent, the link device LD directly sends subsequent video data. However, when the pending transmission data buffer WSBUF does not have the pending data packet $DP_{WS}$, a dummy packet $DP_{DUMMY}$ is obtained from the data buffer circuit DABUF of the retry buffer RSBUF, and the packet sequence number of the dummy packet $DP_{DUMMY}$ is set according to the retry packet sequence number $SEQ_1$. For example, when the retry packet sequence number $SEQ_1$ equals 1, the packet sequence number of the dummy packet $DP_{DUMMY}$ is set to 1. Then, the packet transmission circuit PSCKT sends the dummy packet $DP_{DUMMY}$ as the packet $DP_2$ to the link partner LP. In other words, when the pending transmission data buffer WSBUF has no video data of the camera waiting to be sent, the link device LD sends the dummy packet $DP_{DUMMY}$ to the link partner LP.

In another embodiment, regardless of whether or not the pending transmission data buffer WSBUF has the pending data packet $DP_{WS}$, when the link partner LP requests a resend of the data packet $DP_1$, the present embodiment directly obtains the dummy packet $DP_{DUMMY}$ from the data buffer circuit DABUF of the retry buffer RSBUF, and sets the packet sequence number of the dummy packet $DP_{DUMMY}$ according to the retry packet sequence number $SEQ_1$. For example, when the retry packet sequence number $SEQ_1$ equals 1, the packet sequence number of the dummy packet $DP_{DUMMY}$ is set to 1. Then, the packet transmission circuit PSCKT sends the dummy packet $DP_{DUMMY}$ as the packet $DP_2$ to the link partner LP. In other words, regardless of whether or not the pending transmission data buffer WSBUF has video data of the camera waiting to be sent, when the link partner LP requests a resend of the data packet $DP_1$, the link device LD sends the dummy packet $DP_{DUMMY}$ to the link partner LP.

When the packet $DP_1$ is a command packet, the link device LD resends the packet $DP_1$. At this time, the link device LD obtains the packet $DP_1$ from the command buffer circuit CMDBUF of the retry buffer RSBUF according to the retry packet sequence number $SEQ_1$, and resends the packet $DP_1$ to the link partner LP.

According to the method 200, when the link device LD and the link partner LP perform real-time transfer over the PCIe interface, in one embodiment, if the packet $DP_1$ that the link partner LP requests be resent is a data packet, it is determined whether or not the pending transmission data buffer WSBUF has buffered real-time data waiting to be sent. When the pending transmission data buffer WSBUF has real-time data waiting to be sent, the link device LD directly sends subsequent real-time data. When the pending transmission data buffer WSBUF does not have real-time data waiting to be sent, the link device LD sends the dummy packet $DP_{DUMMY}$ to the link partner LP. The dummy packet $DP_{DUMMY}$ has 72 bytes of dummy data to comply with the PCIe standard. In another embodiment, regardless of whether or not the pending transmission data buffer WSBUF has data waiting to be sent, when the link partner LP requests a resend of the data packet $DP_1$, the link device LD directly sends the dummy packet $DP_{DUMMY}$ to the link partner LP. In the method 200, in the retry buffer RSBUF of the link device LD, the data buffer circuit DABUF only has 72 bytes of storage for storing dummy data, and the command buffer circuit CMDBUF only needs to have (M×72) bytes of storage to buffer M command packets $DP_{CMD}$. Thus, compared to the prior art link device 100, the link device LD using the method of the above embodiments can reduce retry buffer RSBUF size.

Figure 3:
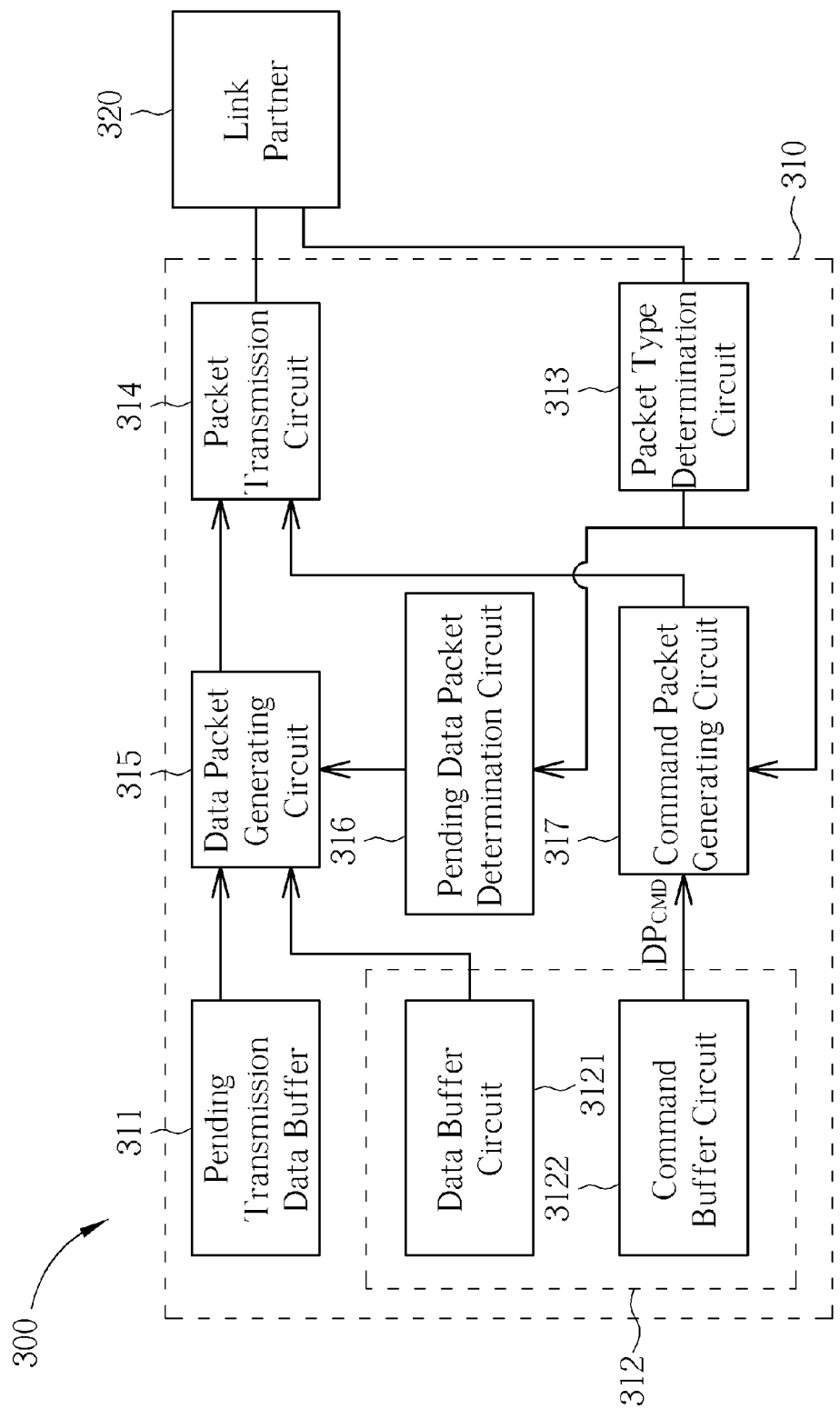
FIG. 3 is a diagram of a device for performing real-time transfer over a PCIe interface according to an embodiment of the present invention.

Please refer to FIG. 3, which is a diagram of a device 300 for performing real-time transfer over a PCIe interface according to an embodiment of the present invention. The device 300 comprises a link device 310 and a link partner 320. The link device 310 comprises a pending transmission data buffer 311, a retry buffer 312, a packet type determination circuit 313, a packet transmission circuit 314, a data packet generating circuit 315, a pending data packet determination circuit 316, and a command packet generating circuit 317. The pending transmission data buffer 311 is utilized for buffering data that is waiting to be sent. For example, the pending transmission data buffer 311 may store video data of a camera that is waiting to be sent. The retry buffer 312 comprises a data buffer circuit 3121, and a command buffer circuit 3122. The data buffer circuit 3121 stores a dummy packet $DP_{DUMMY}$. The dummy packet $DP_{DUMMY}$ has 72 bytes of dummy data. The command buffer circuit 3122 is used for buffering already sent command packets. The packet type determination circuit 313 determines the type of the packet DP corresponding to a packet sequence number SEQ according to the packet sequence number SEQ. The packet transmission circuit 314 is utilized for transmitting packets, and the packet transmission circuit 314, during packet transmission, records the packet sequence number and corresponding packet type (command packet or data packet) of each packet to build a lookup table TA relating packet sequence numbers and types. The link partner 320 is utilized for receiving packets sent by the link device 310. When the link partner 320 has not successfully received the packet $DP_1$ sent by the link device 310, the link partner 320 sends the retry command $CMD_{NAK}$ to request that the link device 310 resend the packet $DP_1$. At this time, the packet type determination circuit 313 obtains a retry packet sequence number $SEQ_{RS}$ according to the retry command $CMD_{NAK}$, where the retry packet sequence number $SEQ_{RS}$ is the packet sequence number $SEQ_1$ of the packet $DP_1$. The packet type determination circuit 313 determines the type of the packet $DP_1$ according to the lookup table TA and the retry packet sequence number $SEQ_{RS}$ (the packet sequence number $SEQ_1$ of the packet $DP_1$). The packet transmission circuit decides to resend the packet $DP_1$ or directly send a packet $DP_2$ different from the packet $DP_1$ according to the type of the packet $DP_1$. More specifically, when the packet type determination circuit 313 determines that the packet $DP_1$ is a data packet, the packet transmission circuit 314 sends the packet $DP_2$. When the packet type determination circuit 313 determines that the packet $DP_1$ is a command packet, the packet transmission circuit 314 resends the packet $DP_1$.

When the packet type determination circuit 313 determines that packet $DP_1$ that the link partner 320 is requesting be resent is a data packet, the data packet generating circuit 315 generates the packet $DP_2$ to provide to the packet transmission circuit 314 to send to the link partner 320. More specifically, in one embodiment, when the packet type determination circuit 313 determines that the packet $DP_1$ that the link partner 320 is requesting be resent is a data packet, the pending data packet determination circuit 316 first determines whether or not the pending transmission data buffer 311 has a pending data packet $DP_{WS}$. When the pending data packet determination circuit 316 determines that the pending transmission data buffer 311 has a pending data packet $DP_{WS}$ (e.g. the pending transmission data buffer 311 has video data of a camera waiting to be sent), the pending data packet determination circuit 311 controls the data packet generating circuit 315 sets the packet sequence number of the pending data packet $DP_{WS}$ according to the retry packet sequence number $SEQ_{RS}$ (e.g. by setting the packet sequence number of the pending data packet $DP_{WS}$ to the retry packet sequence number $SEQ_{RS}$). The data packet generating circuit 315 provides the pending data packet $DP_{WS}$ to the packet transmission circuit 314 as the packet $DP_2$ to send to the link partner 320. When the pending data packet determination circuit 316 determines that the pending transmission data buffer 314 does not have the pending data packet $DP_{WS}$, the pending data packet determination circuit 316 controls the data packet generating circuit 315 to set the packet sequence number of the dummy packet $DP_{DUMMY}$ in the data buffer circuit 3121 according to the retry packet sequence number $SEQ_{RS}$ (e.g. setting the packet sequence number of the dummy packet $DP_{DUMMY}$ to the retry packet sequence number $SEQ_{RS}$), and provides the dummy packet $DP_{DUMMY}$ to the packet transmission circuit 314 as the packet $DP_2$ to send to the link partner 320. In another embodiment, regardless of whether or not the pending transmission data buffer WSBUF has data waiting to be sent, when the link partner LP requests a resend of the data packet $DP_1$, the pending data packet determination circuit 316 controls the data packet generating circuit 315 to set the packet sequence number of the dummy packet $DP_{DUMMY}$ in the data buffer circuit 3121 according to the retry packet sequence number $SEQ_{RS}$, and provide the dummy packet $DP_{DUMMY}$ to the packet transmission circuit 314 as the packet $DP_2$ to send to the link partner 320.

When the packet type determination circuit 313 determines that the packet $DP_1$ that the link partner 320 is requesting be resent is a command packet, the command packet generating circuit 317 reads the packet $DP_1$ in the command buffer circuit 3122 according to the retry packet sequence number $SEQ_{RS}$ to provide to the packet transmission circuit 314 to send to the link partner 320.

In summary, the embodiments provide a method of performing real-time transfer over a PCIe interface that reduces the needed size of a retry buffer. The method provided decides how to resend a packet according to the type of the packet that the link partner is requesting be resent. When the packet that the link partner is requesting be resent is a data packet, the method determines whether the pending transmission data buffer is buffering real-time data waiting to be sent. When the pending transmission data buffer has data waiting to be sent, the link device directly sends the data stored in the pending transmission data buffer. When the pending transmission data buffer does not have data waiting to be sent, the link device sends a dummy packet to the link partner. In this way, according to the method, in the retry buffer of the link device, the data buffer circuit only needs to have 72 bytes of storage to store the dummy packet, and the command buffer circuit only needs (M×72) bytes of storage to buffer M command packets. Thus, the link device can have reduced retry buffer size by employing the method, which provides greater convenience to the user.

Those skilled in the art will readily observe that numerous modifications and alterations of the device and method may be made while retaining the teachings of the invention.

What is claimed is:

1. A method of performing real-time transfer over a Peripheral Component Interconnect Express (PCIe) interface, the method comprising:
    a link device receiving a retry command (NAK) from a link partner to obtain a retry packet sequence number;
    the link device determining type of a first packet that the link partner requests be resent according to the retry packet sequence number; and
    when the type of the first packet is a data packet and the link device does not have a pending data packet, obtaining a dummy packet, setting the packet sequence number of the dummy packet according to the retry packet sequence number, and sending the dummy packet as a second packet to the link partner.

2. The method of claim 1, further comprising:
    the link device building a lookup table of packet sequence numbers and packet types when sending packets.

3. The method of claim 2, wherein the link device determining the type of the first packet that the link partner requests be resent according to the retry packet sequence number comprises:
  determining the type of the first packet that the link partner requests be resent according to the retry packet sequence number and the lookup table.

4. The method of claim 1, further comprising resending the first packet when the type of the first packet is a command packet.

5. The method of claim 1, further comprising
  determining whether or not the pending transmission data buffer has the pending data packet to decide how to send the second packet.

6. The method of claim 1,
  further comprising when the pending transmission buffer has the pending data packet, setting a packet sequence number of the pending data packet according to the retry packet sequence number and sending the pending data packet as the second packet to the link partner.

7. The method of claim 1, wherein the second packet has 72 bytes of dummy data.

8. The method of claim 1, further comprising when the type of the first packet is a data packet and the link device has the pending transmission buffer has the pending data packet obtaining a dummy packet from a data buffer circuit of a retry buffer, setting the packet sequence number of the dummy packet according to the retry packet sequence number, and sending the dummy packet as the second packet to the link partner.

9. The method of claim 8, wherein the second packet has 72 bytes of dummy data.

10. The method of claim 4, wherein resending the first packet when the type of the first packet is the command packet comprises:
  the link device obtaining the first packet from a command buffer circuit of the retry buffer according to the retry packet sequence number, and resending the first packet to the link partner.

11. The method of claim 1, wherein data sent by the first packet is voice data or video data when the type of the first packet is a data packet.

12. A link device for performing real-time transfer with a link partner over a Peripheral Component Interconnect Express (PCIe) interface, the link device comprising:
  a pending transmission data buffer for buffering pending data;
  a retry buffer comprising:
    a data buffer circuit for storing a dummy packet; and
    a command buffer circuit for buffering already sent command packets;
  a packet type determination circuit for determining a type of a packet; and
  a packet transmission circuit for transmitting packets;
  wherein when the link device receives a retry command from the link partner for requesting the link device to resend a first packet, the packet type determination circuit determines type of the first packet according to the retry command, and controls the packet transmission circuit to resend the first packet or directly send a second packet according to the type of the first packet; and
  wherein the packet transmission circuit builds a lookup table recording packet sequence number and packet type of every sent packet, and the packet type determination circuit determines the type of the first packet according to the packet sequence number of the first packet requested to be resent and the lookup table.

13. The link device of claim 12, wherein:
  the packet transmission circuit sends the second packet when the packet type determination circuit determines the type of the first packet is a data packet; and
  the packet transmission circuit resends the first packet when the packet type determination circuit determines the type of the first packet is a command packet.

14. The link device of claim 13, further comprising:
  a data packet generating circuit for controlling the pending transmission data buffer or the data buffer circuit to generate the second packet for the packet transmission circuit when the type of the first packet is the data packet.

15. The link device of claim 14, further comprising:
  a pending data packet determination circuit for determining whether or not the pending transmission data buffer has a pending data packet for controlling the data packet generating circuit to generate the second packet accordingly.

16. The link device of claim 15, wherein:
  when the pending data packet determination circuit determines the pending transmission data buffer has the pending data packet, the pending data packet determination circuit controls the data packet generating circuit to obtain the pending data packet from the pending transmission data buffer, and generate the second packet for the packet transmission circuit according to the pending data packet; and
  when the pending data packet determination circuit determines the pending transmission data buffer does not have the pending data packet, the pending data packet determination circuit controls the data packet generating circuit to obtain the dummy packet from the data buffer circuit, and generate the second packet for the packet transmission circuit according to the dummy packet.

17. The link device of claim 13, further comprising:
  a command packet generating circuit for obtaining the first packet from the command buffer circuit when the type of the first packet requested to be resent is the command packet, and providing the first packet to the packet transmission circuit.

18. The link device of claim 13, further comprising:
  a data packet generating circuit for obtaining the dummy packet from the data buffer circuit when the type of the first packet requested to be resent is the data packet, and generating the second packet for the packet transmission circuit according to the dummy packet.

19. The link device of claim 12, wherein data transmitted by the first packet is voice data or video data when the type of the first packet is a data packet.

20. The link device of claim 12, wherein the second packet has 72 bytes of dummy data.

* * * * *